(12) United States Patent
Li et al.

(10) Patent No.: US 10,602,480 B2
(45) Date of Patent: Mar. 24, 2020

(54) PAGING METHOD AND DEVICE

(71) Applicant: Huawei Technologies Co., Ltd., Shenzhen (CN)

(72) Inventors: Guorong Li, Shenzhen (CN); Lili Zhang, Beijing (CN); Aimin Justin Sang, San Diego, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/345,608

(22) PCT Filed: Oct. 28, 2016

(86) PCT No.: PCT/CN2016/103719
§ 371 (c)(1),
(2) Date: Apr. 26, 2019

(87) PCT Pub. No.: WO2018/076266
PCT Pub. Date: May 3, 2018

(65) Prior Publication Data
US 2019/0342853 A1  Nov. 7, 2019

(51) Int. Cl.
*H04W 68/02* (2009.01)
*H04W 76/28* (2018.01)

(52) U.S. Cl.
CPC ............ *H04W 68/02* (2013.01); *H04W 76/28* (2018.02)

(58) Field of Classification Search
CPC ............................... H04W 68/02; H04W 76/28
See application file for complete search history.

(56) References Cited

U.S. PATENT DOCUMENTS

| 2013/0015953 A1* | 1/2013 | Hsu | H04W 4/08 340/7.46 |
|---|---|---|---|
| 2015/0257094 A1 | 9/2015 | Wei et al. | |
| 2016/0227512 A1 | 8/2016 | Wu et al. | |

FOREIGN PATENT DOCUMENTS

| CN | 101242654 A | 8/2008 |
|---|---|---|
| CN | 101841911 A | 9/2010 |
| CN | 102118875 A | 7/2011 |
| CN | 104427616 A | 3/2015 |
| CN | 104854927 A | 8/2015 |

(Continued)

OTHER PUBLICATIONS

3GPP TSG-RAN WG3 Meeting #92 R3-161352 Nanjing, China, May 23-27, 2016 (Year: 2016).*

(Continued)

*Primary Examiner* — Nizar N Sivji
(74) *Attorney, Agent, or Firm* — Conley Rose, P.C.

(57) ABSTRACT

The present invention discloses a paging method and apparatus, The method includes: obtaining, by a first access network device in a first time period, a first paging parameter group used for paging a terminal device, where the first time period is a time period before the terminal device switches from a connected mode to a light connected mode, and the first access network device is an access network device to which the terminal device is connected last time before the terminal device enters the light connected mode or an idle mode; and generating, by the first access network device, a paging message for the terminal device based on the first paging parameter group, and sending the paging message.

20 Claims, 4 Drawing Sheets

(56) References Cited

FOREIGN PATENT DOCUMENTS

| CN | 105393613 A | 3/2016 |
|---|---|---|
| CN | 105657861 A | 6/2016 |

OTHER PUBLICATIONS

Machine Translation and Abstract of Chinese Publication No. CN101242654, Aug. 13, 2008, 11 pages.

Machine Translation and Abstract of Chinese Publication No. CN101841911, Sep. 22, 2010, 12 pages.

Machine Translation and Abstract of Chinese Publication No. CN102118875, Jul. 6, 2011, 18 pages.

Machine Translation and Abstract of Chinese Publication No. CN105657861, Jun. 8, 2016, 35 pages.

"3rd Generation Partnership Project; Technical Specification Group Radio Access Network; Evolved Universal Terrestrial Radio Access (E-UTRA); User Equipment (UE) procedures in idle mode (Release 14)," 3GPP TS 36.304, V14.0.0, Sep. 2016, 46 pages.

"3rd Generation Partnership Project; Technical Specification Group Radio Access Network; Evolved Universal Terrestrial Radio Access (E-UTRA); Radio Resource Control (RRC); Protocol specification (Release 14)," 3GPP TS 36.331, V14.0.0, Sep. 2016, 644 pages.

"3rd Generation Partnership Project; Technical Specification Group Radio Access Network; Evolved Universal Terrestrial Radio Access Network (E-UTRAN); S1 Application Protocol (S1AP) (Release 14)," 3GPP TS 36.413, V14.0.0, Sep. 2016, 333 pages.

Huawei, et al., "Evaluation on RAN initiated paging and MME initiated paging," R2-163930, 3GPP TSG-RAN WG2 Meeting #94, Nanjing, China, May 23-27, 2016, 12 pages.

Nokia, et al., "Paging for light connection," R3-161352, 3GPP TSG-RAN WG3 Meeting #92, Nanjing, China, May 23-27, 2016, 6 pages.

Huawei, et al., "New WI proposal: Signalling reduction to enable light connection for LTE" RP-160540, 3GPP TSG RAN Meeting #71, Gothenburg, Sweden, Mar. 7-10, 2016, 7 pages.

Foreign Communication From a Counterpart Application, PCT Application No. PCT/CN2016/103719, English Translation of International Search Report dated Jul. 10, 2017, 2 pages.

Foreign Communication From a Counterpart Application, PCT Application No. PCT/CN2016/103719, English Translation of Written Opinion dated Jul. 10, 2017, 3 pages.

Machine Translation and Abstract of Chinese Publication No. CN105393613, Mar. 9, 2016, 36 pages.

Foreign Communication From A Counterpart Application, Chinese Application No. 201680087685.5, Chinese Office Action dated Feb. 6, 2020, 8 pages.

* cited by examiner

PAGING METHOD AND DEVICE

CROSS-REFERENCE TO RELATED APPLICATIONS

This application is a national stage of International Application No. PCT/CN2016/103719, filed on Oct. 28, 2016, which is hereby incorporated by reference in its entirety.

TECHNICAL FIELD

The present invention relates to the communications field, and more specifically, to a paging method and device.

BACKGROUND

A concept of light connection (Light Connection) is proposed in the 3rd Generation Partnership Project (3rd Generation Partnership Project, "3GPP" for short) Release 14 (Release 14). A network device may instruct a terminal device to enter a light connected mode from a radio resource control (Radio Resource Control, "RRC" for short) connected mode. After entering the light connected mode, the terminal device hides a status of the terminal device from a core network device in other words, the core network device does not know the status of the terminal device. When downlink data arrives, the core network device still processes the downlink data based on an assumption that the terminal device is in the connected mode, and sends the downlink data to an access network device (for example, a base station) to which the terminal device is connected last time. When the downlink data arrives at the access network device, the access network device may be triggered to initiate paging on the terminal device, to wake up the terminal device, thereby completing downlink data transmission.

In the prior art, a terminal device in an idle (idle) mode monitors a physical downlink control channel (Physical Downlink Control Channel, "PDCCH" for short) in a specific subframe (namely, a paging frame (Paging Frame, "PF" for short)). If a paging message is indicated on the PDCCH channel, the terminal device demodulates a paging channel (Paging Channel, "PCH" for short) to determine whether the paging message belongs to the terminal device. The PF is obtained through calculation based on a discontinuous reception (Discontinuous Reception, "DRX" for short) cycle. Each terminal device has a dedicated discontinuous reception (Discontinuous Reception, "DRX" for short) cycle and a unique identifier (for example, an international mobile subscriber identity (International Mobile Subscriber Identity, "IMSI" for short)).

Therefore, when the access network device receives the downlink data sent by the core network device, how to effectively page the terminal device is a technical problem that needs to be urgently resolved.

SUMMARY

This application provides a paging method and device, so that an access network device obtains a paging parameter used for paging a terminal device, and pages the terminal device based on the paging parameter, thereby waking up the terminal device quickly and effectively.

According to a first aspect, a paging method is provided, including:

obtaining, by a first access network device in a first time period, a first paging parameter group used for paging a terminal device, where the first time period is a time period before the terminal device switches from a connected mode to a light connected mode, and the first access network device is an access network device to which the terminal device is connected last time before the terminal device enters the light connected mode or an idle mode; or obtaining, by a first access network device in a second time period, a first paging parameter group used for paging a terminal device, where the terminal device is in the light connected mode or the idle mode in the second time period; and generating, by the first access network device, a paging message for the terminal device based on the first paging parameter group, and sending the paging message.

In view of the above, according to the paging method in this embodiment of the present invention, the first paging parameter group used for paging the terminal device is obtained in the first time period, and when the terminal device enters the light connected mode, the terminal device may be directly paged based on the first paging parameter group, so that the terminal device can be effectively paged, and signaling overheads of core network paging are reduced.

With reference to the first aspect, in a first possible implementation of the first aspect, the first paging parameter group includes a terminal identifier ID, the terminal ID is obtained through calculation by using an international mobile subscriber identity IMSI of the terminal device, and the IMSI is used to uniquely identify the terminal device.

Optionally, the first paging parameter group further includes a first paging ID and/or a dedicated discontinuous reception DRX cycle.

The first paging ID is assigned by a core network device to the terminal device based on the IMSI of the terminal device when the terminal device establishes the RRC connection, and the dedicated DRX cycle is determined by the terminal device.

With reference to the first aspect or the foregoing possible implementation of the first aspect, in a second possible implementation of the first aspect, if the first access network device obtains the first paging parameter group in the first time period, the obtaining, by a first access network device in a first time period, a first paging parameter group used for paging a terminal device includes:

receiving, by the first access network device in the first time period, a first radio resource control RRC message sent by the terminal device, where the first RRC message carries the first paging parameter group; or receiving, by the first access network device in the first time period, a first S1 interface signaling sent by the core network device, where the first S1 interface signaling carries the first paging parameter group.

Optionally, the first RRC message includes an RRC connection request RRC connection request message or an RRC connection setup complete RRC connection setup complete message; and the first S1 interface signaling includes an initial context setup request initial context setup request message.

Therefore, the first paging parameter group is carried in an existing message in an existing protocol, so that signaling overheads can be reduced. This is simple in implementation.

With reference to the first aspect or the foregoing possible implementations of the first aspect, in a third possible implementation of the first aspect, if the first access network device obtains the first paging parameter group in the second time period, the obtaining, by a first access network device in a second time period, a first paging parameter group used for paging a terminal device includes:

sending, by the first access network device, a paging parameter request message to the core network device in the second time period, where the paging parameter request message carries information used to identify the terminal device; and receiving, by the first access network device, second S1 interface signaling sent by the core network device, where the second S1 interface signaling carries the first paging parameter group.

Optionally, the paging parameter request message includes a paging request message, and the second S1 interface signaling includes an S1 interface paging message.

With reference to the first aspect or the foregoing possible implementations of the first aspect, in a fourth possible implementation of the first aspect, the generating, by the first access network device, a paging message for the terminal device based on the first paging parameter group, and sending the paging message includes:

generating, by the first access network device, a first paging message based on the first paging parameter group;

sending, by the first access network device, the first paging message to the terminal device;

generating, by the first access network device, a second paging message, where the second paging message carries the first paging parameter group; and sending, by the first access network device, the second paging message to a second access network device, where the second paging message is used to trigger the second access network device to send a third paging message to the terminal device based on the first paging parameter group, the second access network device is any access network device in an access network paging area except the first access network device, and the access network paging area is determined by the first access network device.

With reference to the first aspect or the foregoing possible implementations of the first aspect, in a fifth possible implementation of the first aspect, before the generating, by the first access network device, a paging message for the terminal device based on the first paging parameter group, the method further includes:

sending, by the first access network device, a second RRC message to the terminal device, where the second RRC message indicates that the terminal device enters the light connected mode.

Optionally, the second RRC message includes an RRC connection reconfiguration (RRC Connection Reconfiguration) message or an RRC connection release (RRC Connection Release) message.

With reference to the first aspect or the foregoing possible implementations of the first aspect, in a sixth possible implementation of the first aspect, the method further includes:

if the first access network device obtains the first paging parameter group in the first time period, sending, by the first access network device, a second paging ID, or a second paging ID and indication information of a paging moment to the terminal device; or if the first access network device fails to obtain the first paging parameter group in the first time period, sending, by the first access network device, the second paging ID and indication information of the paging moment to the terminal device, where the second paging ID is an ID assigned by the first access network device when the first access network device instructs the terminal device to enter the light connected mode, and the indication information of the paging moment is used to indicate a moment at which the terminal device receives a paging message.

Optionally, the second RRC message carries the second paging ID, or the second RRC message carries the second paging ID and the indication information of the paging moment.

Therefore, if a first base station fails to obtain the first paging parameter group, the first base station may initiate paging on the terminal device based on a second paging parameter group.

With reference to the first aspect or the foregoing possible implementations of the first aspect, in a seventh possible implementation of the first aspect, before the generating, by the first access network device, a paging message for the terminal device based on the first paging parameter group, the method further includes:

generating, by the first access network device, a fourth paging message based on a second paging parameter group, where the second paging parameter group includes the second paging ID, or the second paging parameter group includes the second paging ID and the paging moment;

sending, by the first access network device, the fourth paging message to the terminal device;

generating, by the first access network device, a fifth paging message, where the fifth paging message carries the second paging ID, or the fifth paging message carries the second paging ID and the indication information of the paging moment; and sending, by the first access network device, the fifth paging message to the second access network device, where the fifth paging message is used to trigger the second access network device to send a sixth paging message to the terminal device based on the second paging parameter group.

Further, the generating, by the first access network device, a paging message for the terminal device based on the first paging parameter group, and sending the paging message includes:

if the first access network device and the second access network device fail to receive, within preset duration, a response message sent by the terminal device based on the fourth paging message or the sixth paging message, generating, by the first access network device, the paging message for the terminal device based on the first paging parameter group, and sending the paging message.

In view of the above, according to the paging method in this embodiment of the present invention, a duration threshold is preset. If no response message of the terminal device is received within the preset duration threshold, the base station switches to the first paging parameter group to page the terminal device, to resolve a problem that a paging message cannot be received because the terminal device enters the idle mode, thereby improving paging efficiency of the base station.

According to a second aspect, a paging device is provided, configured to perform the method in any one of the first aspect and the possible implementations of the first aspect. Specifically, the apparatus may include units for performing the method in any one of the first aspect and the possible implementations of the first aspect.

According to a third aspect, a paging device is provided, including a memory and a processor. The memory is configured to store a computer program, and the processor is configured to invoke the computer program from the memory and run the computer program, so that the paging device performs the method in any one of the first aspect and the possible implementations of the first aspect.

According to a fourth aspect, a computer program product is provided. The computer program product includes computer program code. When the computer program code is run by a processing unit and a transceiver unit, or a processor and a transceiver in the paging device in the first aspect, the paging device performs the method in any one of the first aspect and the possible implementations of the first aspect.

According to a fifth aspect, a computer readable storage medium is provided and is configured to store a computer program, and the computer program includes an instruction that is used to perform the method in any one of the first aspect and the possible implementations of the first aspect.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DESCRIPTION OF EMBODIMENTS

Figure 1:
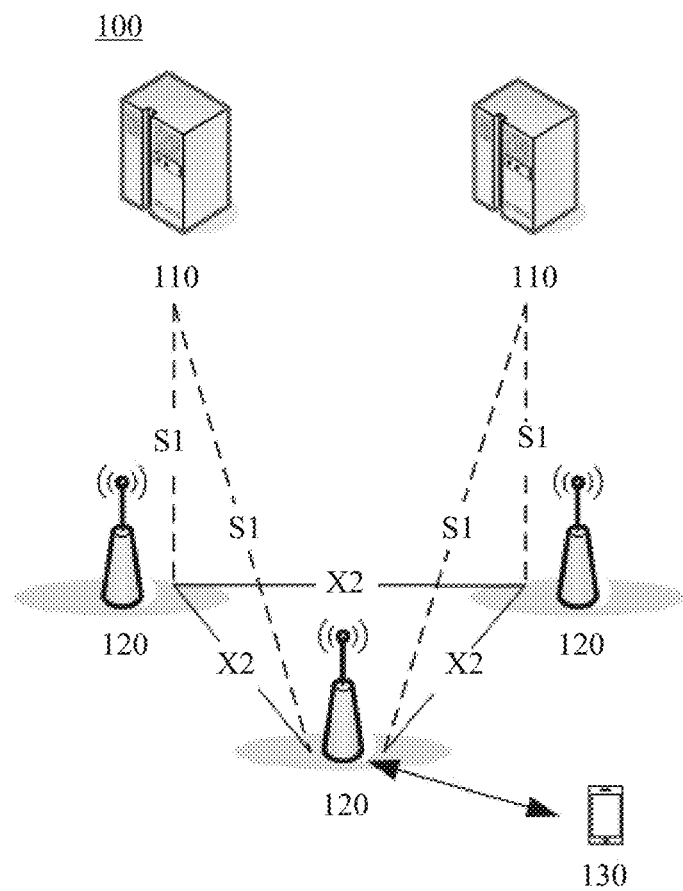
FIG. 1 is a schematic diagram of a communications system to which a paging method according to an embodiment of the present invention is applicable.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be understood that the technical solutions in the present invention may be applied to various communications systems, such as a Global System for Mobile Communications (Global System for Mobile Communications, "GSM" for short), a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short), a Long Term Evolution (Long Term Evolution, "LTE" for short) system, a Long Term Evolution Advanced (Advanced long term evolution, "LTE-A" for short) system, a Universal Mobile Telecommunications System (Universal Mobile Telecommunications System, "UMTS" for short), or a next-generation communications system.

In the embodiments of the present invention, an access network may be a radio access network (Radio Access Network, "RAN" for short), and may be specifically a base station. The base station may be a base transceiver station (Base Transceiver Station, "BTS" for short) in the Global System for Mobile Communications (Global System for Mobile Communications, "GSM" for short) or the Code Division Multiple Access (Code Division Multiple Access, "CDMA" for short) system, may be a NodeB (NodeB) in the Wideband Code Division Multiple Access (Wideband Code Division Multiple Access, "WCDMA" for short) system, or may be an evolved NodeB (Evolved. NodeB, "eNB" or "eNodeB" for short) in the LTE system, a transmission reception point (Transmission Reception Point, "TRP" for short), a base station device, or a micro base station device in a further 5G (5th Generation) network, or the like. This is not particularly limited in the present invention.

A terminal device may communicate with a core network by using the RAN. The terminal device may be referred to as an access terminal, user equipment (User Equipment, "terminal device" for short), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (Session Initiation Protocol, "SIP" for short) phone, a wireless local loop (Wireless Local Loop, "WLL" for short) station, a personal digital assistant (Personal Digital Assistant, "PDA" for short), a handheld device with a wireless communication function, a computing device or another processing device connected to a wireless modem, an in-vehicle device, a wearable device, a terminal device in the next-generation communications system such as the 5G network, a terminal device in a further evolved public land mobile network (Public Land Mobile Network, "FLAVIN" for short), or the like.

In addition, aspects or features of the present invention may be implemented as a method, an apparatus or a product that uses standard programming and/or engineering technologies. The term "product" used in this application covers a computer program that can be accessed from any computer readable component, carrier, or medium. For example, the computer readable medium may include but is not limited to: a magnetic storage component (for example, a hard disk, a floppy disk, or a magnetic tape), an optical disc (for example, a compact disc (Compact Disc, "CD" for short), a digital versatile disc (Digital Versatile Disc, "DVD" for short), a smart card, and a flash memory component (for example, an erasable programmable read-only memory (Erasable Programmable Read-Only Memory, "EPROM" for short), a card, a stick, or a key drive). In addition, various storage media described in this specification may indicate one or more devices and/or other machine readable media that are configured to store information. The term "machine readable media" may include but is not limited to a radio channel, and various other media that can store, contain and/or carry an instruction and/or data.

It should be understood that, in the embodiments of the present invention, the numbers "first", "second", "third", "fourth", "fifth", and "sixth" are merely used to distinguish between different objects, for example, different time periods, different access network devices (for example, base stations), or different paging messages, and should not constitute any limitation on the present invention.

FIG. 1 is a schematic diagram of a communications system 100 to which a paging method according to an embodiment of the present invention is applicable. As shown in FIG. 1, the communications system 100 includes at least one core network device 110, at least one access network device 120, and at least one terminal device 130. The core network device 110 may include a mobility management entity (Mobility Management Entity, "MME" for short), a serving gateway (Serving Gateway, "S-GW" for short), or the like. The access network device may be a base station. A core network and the base station may be communicatively connected through an S1 interface. Specifically, the MME may be connected to the base station through an S1-MME interface, and the S-GW may be connected to the base station through an S1-U interface. Base stations may be communicatively connected to each other through an X2 interface. The terminal device and the base station may be communicatively connected through a wireless communications interface.

It should be understood that the core network device, the access network device, and the terminal device shown in FIG. 1 are merely examples of identifiers, and the communications system may further include more core network devices, access network devices, or terminal devices. A quantity of core network devices, access network devices, or terminal devices is not particularly limited in the present invention.

Generally, communication among the MME, the base station, and the terminal device is described below. It should be understood that the MME, the base station, and the terminal device shown herein are merely examples for description, and should not constitute any limitation on the present invention. Another core network device, access network device, or terminal device defined in a future protocol is not excluded in the present invention, so that same or similar functions are implemented.

In the communications system shown in FIG. 1, the terminal device may establish an RRC connection to the base station to access a network. The terminal device that establishes the RRC connection is in a connected mode, and the terminal device that releases the RRC connection is in an idle (idle) mode. Data may be received and sent between the terminal device in the connected mode and a network device, and there is no signaling connection between the terminal device in the idle mode and the network device. The terminal device in the idle mode may reduce power consumption through DRX.

In 3GPP Release 14, a new connected mode, namely, a light connected anode, is proposed. If the base station finds that the terminal device is inactive in a time period, the base station may instruct the terminal device to enter the light connected mode. After entering the light connected mode, the terminal device hides a status of the terminal device from the MME. In other words, the MME does not know the status of the terminal device, and still considers that the terminal device is in the connected mode. When downlink data arrives, the MME still processes the downlink data based on an assumption that the terminal device is in the connected mode, and sends the downlink data to a base station to which the terminal device is connected last time (herein, for ease of differentiation and description, the base station to which the terminal device is connected last time before the terminal enters the light connected mode or the idle mode is denoted as an anchor base station). The anchor base station that receives the downlink data initiates paging on the terminal device in an access network paging area, to wake up the terminal device to transmit data with a network side.

Herein, it should be noted that the access network paging area may be preconfigured by an operator in each base station, or may be determined by the anchor base station based on a moving characteristic of the terminal device. Determining of the access network paging area is not particularly limited in the present invention.

In the prior art, a terminal device in an idle mode may calculate a paging frame (Paging Frame, "PF" for short) and a paging occasion (Paging Occasion, "PO" for short), and monitors a PDCCH based on a calculated location, to obtain a paging message. Both the PF and the PO are related to an identifier (Identifier, "ID" for short, where the identifier of the terminal device is "UE_ID" for short below) of the terminal device and a DRX cycle of the terminal device.

Specifically, a location of the PF is:

$$PF=SFN \bmod T=(T \text{ div } N)\times(UE\_ID \bmod N).$$

An index of the PO in the PF is:

$$i\_s=floor(UE\_ID/N) \bmod N_S.$$

The UE_ID may be determined based on an international mobile subscriber identity (International Mobile Subscriber Identification Number, "IMSI" for short) of the terminal device, to be specific, UE_ID=IMSI mod 1024. T represents the DRX cycle of the terminal device. If an upper layer (namely, a non-access stratum (Non-Access Stratum, "NAS" for short) assigns a dedicated DRX value (namely, a UE specific DRX) of the terminal device, is a minimum value in the UE specific DRX value and a default DRX value that is broadcast (to be specific, assigned by a cell) in system information. If the upper layer does not configure the UE specific DRX, a default value is used. N=min (T, nB), and a value of nB is 4T, 2T, T, ½T, ¼T, ⅛T, ¹⁄₁₆T, or ¹⁄₃₂T. $N_S$=max (1, nB/T). In the foregoing formula, mod represents performing a modulo operation, div represents obtaining a quotient and a remainder, and floor represents rounding down.

It can be learned from the foregoing formula that the PF and the PO are closely related to the UE_ID and the DRX (the UE specific DRX or the default DRX) value.

If the anchor base station does not know a related parameter (denoted as a paging parameter for ease of description)

of the terminal device when initiating paging, and the terminal device still monitors the PDCCH by using the foregoing method, the terminal device may fail to obtain a paging message through monitoring for a long time and is always in the light connected mode or enters the idle mode. Therefore, the anchor base station cannot effectively page the terminal device, and the terminal device cannot receive, in time, downlink data sent by the network side. Consequently, user experience is seriously affected.

In view of the above, the embodiments of the present invention provide a paging method. Before initiating paging on the terminal device, the anchor base station first obtains the paging parameter of the terminal device, and then performs paging based on the paging parameter, to wake up the terminal device quickly and effectively, thereby completing data transmission.

The paging method in the embodiments of the present invention is described in detail below with reference to FIG. 2 to FIG. 4.

Figure 2:
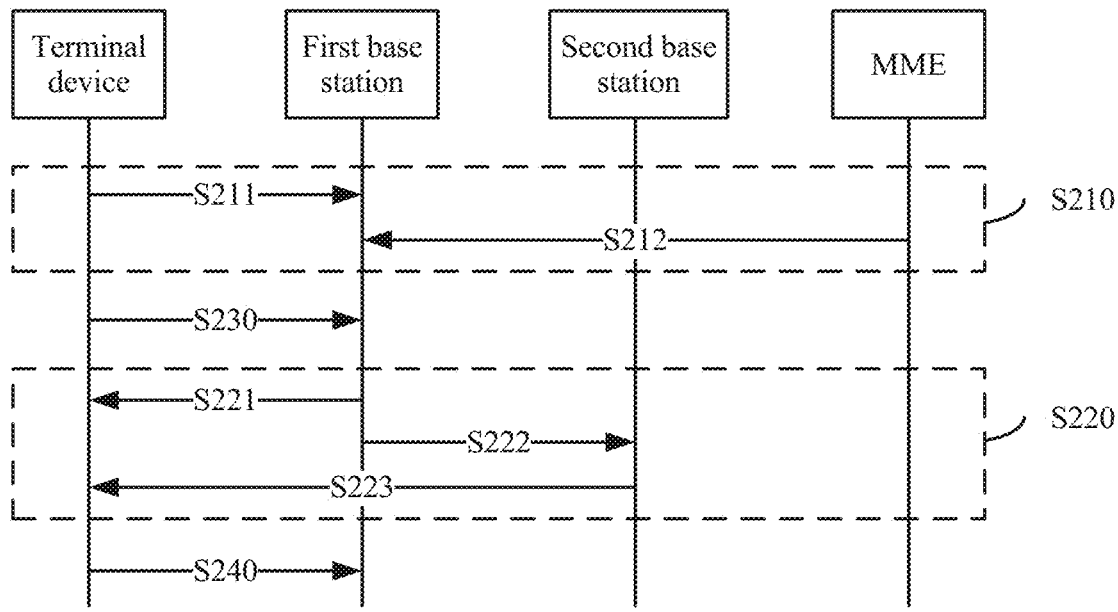
FIG. 2 is a schematic flowchart of a paging method according to an embodiment of the present invention.
Figure 3:
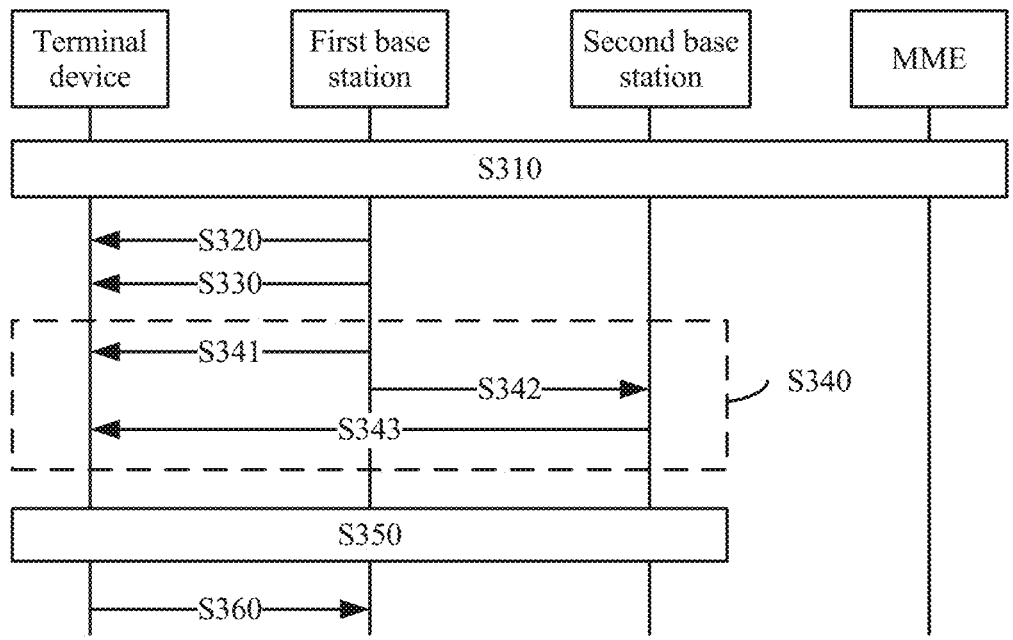
FIG. 3 is a schematic flowchart of a paging method according to another embodiment of the present invention.
Figure 4:
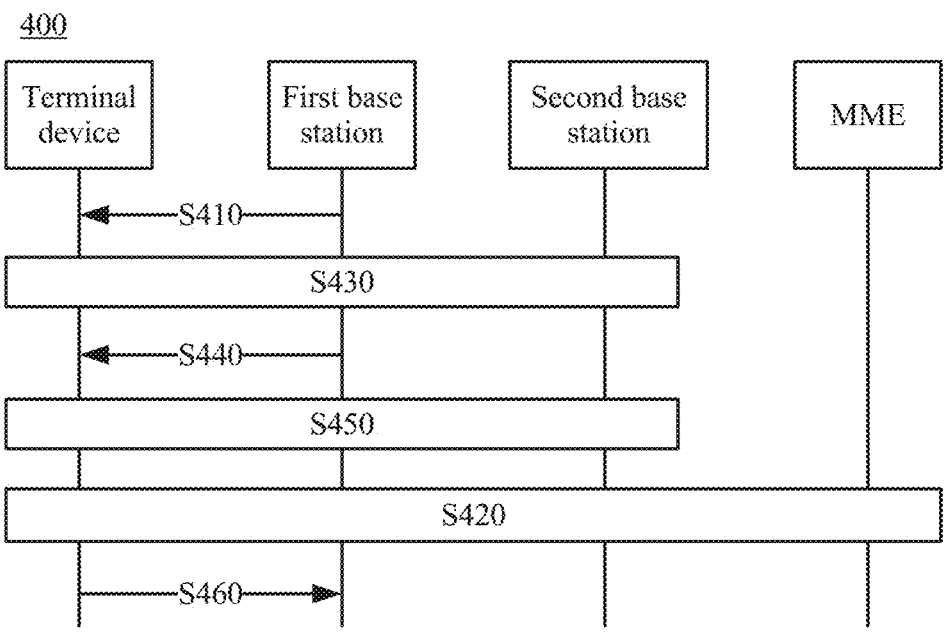
FIG. 4 is a schematic flowchart of a paging method according to still another embodiment of the present invention.

It should be understood that FIG. 2 to FIG. 4 are schematic flowcharts of the paging method in the embodiments of the present invention, and show detailed communication steps or operations of the method. However, these steps or operations are merely examples. Other operations or variations of various operations in FIG. 2, FIG. 3, or FIG. 4 may be further performed in the embodiments of the present invention. In addition, the steps in FIG. 2, FIG. 3, or FIG. 4 may be separately performed in a sequence different from that presented in FIG. 2, FIG. 3, or FIG. 4, and it is possible that not all the operations in FIG. 2, FIG. 3, or FIG. 4 need to be performed.

It should be noted that, for ease of differentiation and description, in the following embodiments, the anchor base station is denoted as a first base station (namely, an example of a first access network device), and any base station except the first base station in an access network paging area is denoted as a second base station (namely, an example of a second access network device). In other words, both the first base station and the second base station are located in the access network paging area. The access network paging area is determined by the first base station or is preconfigured. In addition, a relationship between the first base station and the second base station is not fixed. When the terminal device is within a coverage area of a base station (for example, denoted as a base station #1) in a time period (for example, denoted as a time period #A), and enters a light connected mode in a next time period (for example, denoted as a time period #B) of the time period #A, the base station 41 is an anchor base station (or the first base station) of the terminal device, and another base station in an access network paging area configured by the base station #1 may be the second base station. In a next time period (for example, denoted as a time period #C) of the time period #B, if the terminal device moves to a coverage area of another base station (for example, denoted as a base station #2), and enters a light connected mode in a next time period (for example, denoted as a time period #D) of the time period #C, the base station #2 is an anchor base station of the terminal device, and another base station in an access network paging area configured by the base station #2 may be the second base station.

It should be further noted that access network paging areas configured by base stations may be the same or different. This is not particularly limited in the present invention. However, regardless of whether the access network paging areas configured by the base stations are the same or different, the access network paging areas are configured by cell, in other words, an access network paging area includes at least one cell, FIG. 2 is a schematic flowchart of a paging method 200 according to an embodiment of the present invention. As shown in FIG. 2, the paging method 200 includes the following steps.

S210. A first base station obtains, in a first time period, a first paging parameter group used for paging a terminal device.

For ease of understanding, a time period before the terminal device switches from a connected mode to a light connected mode is denoted as the first time period herein. In the first time period, the terminal device may first request to establish an RRC connection to a serving base station (for example, the first base station), and after establishing the RRC connection, transmit data to a core network device by using the first base station.

Optionally, S210 may specifically include S211 or S212.

S211. The first base station receives, in the first time period, a first RRC message sent by the terminal device, where the first RRC message carries the first paging parameter group.

S212. The first base station receives, in the first time period, first S1 interface signaling sent by an MME, where the first S1 interface signaling carries the first paging parameter group.

As an example instead of a limitation, the first paging parameter group may include a terminal ID. The terminal ID may correspond to the UE_ID described above, to be specific, a value obtained based on IMSI mod 1024. The terminal device may obtain the terminal ID through calculation based on an IMSI of the terminal device, and the MME may also obtain the terminal ID through calculation based on an IMSI sent by the terminal device.

Optionally, the first paging parameter group may further include a first paging identifier. The first paging identifier may be understood as an identifier used to indicate a paged object in a paging process. The first paging identifier may be an identifier assigned, in a process in which the terminal device attaches to a network for the first time, by the MME to the terminal device based on the IMSI sent by the terminal device. The terminal device may store the identifier, so that the identifier can be carried in a subsequent RRC connection establishment process.

Typically, the first paging identifier may be a System Architecture Evolution temporary mobile subscriber identity (System Architecture Evolution ("SAE" for short) Temporary Mobile Station Identifier, "S-TMSI" for short).

It should be understood that, specific content of the first paging identifier illustrated herein is merely an example for description, and should not constitute any limitation on the present invention. The first paging identifier may be the S-TMSI or the IMSI, or may even be another identifier used to uniquely identify the terminal device. This is not particularly limited in the present invention. It should be further understood that, in this embodiment of the present invention, for ease of differentiation and description only, a paging identifier (for example, the first paging identifier and a second paging identifier mentioned below) and the terminal identifier are named differently. However, this should not constitute any limitation on the present invention, and another name may be used to implement functions that are the same as or similar to those of the paging identifier and the terminal identifier in the present invention.

In this embodiment of the present invention, the first paging parameter group may be carried in the first RRC message, and the first RRC message may include an RRC connection request (RRC Connection Request) message or an RRC connection setup complete (RRC Connection Setup Complete) message.

Correspondingly, that the first base station receives, in the first time period, a first RRC message sent by the terminal device, where the first RRC message carries the first paging parameter group includes:

the first base station receives, in the first time period, an RRC connection request message sent by the terminal device, where the RRC connection request message carries the first paging parameter group; or the first base station receives, in the first time period, an RRC connection setup complete message sent by the terminal device, where the RRC connection setup complete message carries the first paging parameter group.

In this embodiment of the present invention, the first paging parameter group may be carried in the first S1 interface signaling, and the first S1 interface signaling may include an initial context setup request initial context setup request message.

Correspondingly, that the first base station receives, in the first time period, first S1 interface signaling sent by an MME, where the first S1 interface signaling carries the first paging parameter group specifically includes:

the first base station obtains the first paging parameter group from the terminal device when the terminal device requests an RRC connection, or obtains the first paging parameter group from the MME after the terminal device establishes an RRC connection.

It should be understood that, the foregoing listed message used to carry the first paging parameter group is merely an example for description, and should not constitute any limitation on the present invention. The first paging parameter group may be carried in an existing message specified in an existing protocol (for example, the specific message listed above, or another existing message). Information used to indicate the first paging parameter group is added to the existing message, or may be carried in a newly added message, in other words, a message is newly added to the existing protocol to carry the first paging parameter group. This is not particularly limited in the present invention. A method for carrying the first paging parameter group in the existing message specified in the existing protocol is easy to implement, and in addition, signaling overheads can be reduced.

Further, the first paging parameter group may further include a dedicated DRX cycle.

Specifically, the dedicated DRX cycle may correspond to the UE specific DRX value described above. The UE specific DRX value may be sent to the MME together with the IMSI or may be sent independently when the terminal device attaches to the network for the first time. Therefore, the first base station may also obtain the UE specific DRX value from the terminal device or the MME in the first time period. A specific process is described in detail above. For brevity, details are not described herein again.

It should be noted that, in this embodiment of the present invention, if the first base station can obtain the UE specific DRX value, the first base station pages the terminal device based on the UE specific DRX value, or if the first base station cannot obtain the UE specific DRX value, the first base station may page the terminal device based on a default DRX value of a cell. This is not particularly limited in the present invention.

S220. The first base station generates a paging message for the terminal device based on the first paging parameter group, and sends the paging message.

When receiving downlink data to be sent by an S-GW to the terminal device, the first base station may generate the paging message based on the first paging parameter group, to page the terminal device in an access network paging area. The first base station may directly page the terminal device, or may page the terminal device by using another base station (for example, a second base station), to eliminate a possibility that the terminal device cannot receive a paging message because the terminal device leaves a coverage area of the first base station due to moving.

Optionally, S220 may specifically include the following steps.

S221. The first base station generates a first paging message based on the first paging parameter group, and sends the first paging message to the terminal device.

S222. The first base station generates a second paging message based on the first paging parameter group, and sends the second paging message to a second base station, where the second paging message carries the first paging parameter group, the second paging message is used to trigger the second base station to send the third paging message to the terminal device based on the first paging parameter group, the second base station is any base station in an access network paging area except the first base station, and the access network paging area is determined by the first base station.

S223. The second base station sends the third paging message to the terminal device based on the first paging parameter group.

The first base station and the second base station each may send a paging message to the terminal device based on the first paging parameter group. In other words, the first base station pages the terminal device in the access network paging area (to be specific, a range of one or more cells).

Herein, it should be noted that if the first paging parameter group carries the dedicated DRX cycle, and the dedicated DRX cycle is shorter than a DRX cycle configured by default by the first base station or the second base station, the first base station and the second base station each may send a paging message to the terminal device based on the terminal ID and the dedicated DRX cycle that are carried in the first paging parameter group. In this case, the first paging message and the third paging message may be a same paging message, to be specific, the first paging message and the third paging message carry a same PF and a same PO.

If the first paging parameter group does not carry the dedicated DR, cycle, or if the first paging parameter group carries the dedicated DRX cycle, but the dedicated DRX cycle is longer than a DRX cycle configured by default by the first base station or the second base station, the first base station may select a smaller DRX cycle to calculate a PF and a PO based on a length relationship between the DRX cycle configured by default and the dedicated DRX, and the second base station may also select a smaller DRX cycle to calculate a PF and a PO based on a length relationship between the DRX cycle configured by default and the dedicated DRX (it may be understood that cells corresponding to the first base station and the second base station are different, and DRX cycles configured by default by the first base station and the second base station may also be different). In this case, a PF and a PO for sending the first paging message by the first base station may be different from a PF and a PO for sending the third paging message by the second base station. In other words, the first paging message and the third paging message are different paging messages.

Optionally, before S220, the paging method 200 further includes the following steps.

S230: The terminal device sends a second RRC message to the first base station where the second RRC message indicates that the terminal device enters a light connected mode.

If the terminal device is in an RRC connected mode, the first base station may be used as a serving base station of the terminal device to learn of activeness of the terminal device. If the first base station finds that the terminal device does not transmit data in a relatively long time period, or in other words, the terminal device is not active, the first base station may instruct the terminal device to enter the light connected mode instead of notifying the MME of a status of the terminal device.

Optionally, the second RRC message may be an RRC connection reconfiguration (RRC Connection Reconfiguration) message or an RRC connection release (RRC Connection Release) message.

It should be understood that a specific method and process in which the first base station instructs the terminal device to enter the light connected mode is similar to that in the prior art. For brevity, details are not described herein.

It should be noted that, after entering the light connected mode, the terminal device may further enter an idle mode.

S240. The terminal device sends a response message based on the first paging message or the third paging message.

For the terminal device, although the first base station and the second base station each send the first paging message to the terminal device in S220, the terminal device may camp on only one cell at a specific moment (for ease of differentiation and description, a base station to which the cell belongs may be denoted as a target base station, and it may be understood that the target base station may be the first base station or the second base station, and this is not particularly limited in the present invention). To be specific, the terminal device may receive only one first paging message (denoted as a target paging message for ease of differentiation and description, where the target paging message is the first paging message or the third paging message), and send a response message to the target base station that sends the target paging message.

In this embodiment of the present invention, the response message sent by the terminal device to the target base station may be an RRC connection reestablishment request (RRC Connection Reestablishment Request) message, an RRC connection resume request (RRC Connection Resume Request) message, or an RRC connection setup request (RRC Connection Request) message.

Specifically, if the target base station is still the first base station, the terminal device initiates an RRC connection reestablishment process, an RRC connection resume process, or an RRC connection process, and after the RRC connection is established, the first base station sends downlink data sent by the MME to the terminal device.

If the target base station is the second base station, the terminal device initiates an RRC connection reestablishment process, an RRC connection resume process, or an RRC connection setup process. After the RRC connection is established, the second base station obtains context information of the terminal device from the first base station. The first base station forwards downlink data to be sent to the terminal device to the second base station, and the second base station sends the downlink data to the terminal device. In addition, the second base station sends a path switch notification to the MME, to instruct the S-GW to modify a downlink path to the second base station. To be specific, if the terminal device enters the light connected mode again, the second base station becomes an anchor base station of the terminal device.

It should be understood that, for ease of understanding, only a case in which the terminal device sends a response message to the first base station based on the first paging message is shown in the figure, and should not be construed as any limitation on the present invention. The terminal device may also send a response message to the second base station based on the third paging message.

It should be further understood that, an action to be performed after the terminal device sends the response message based on the first paging message or the third paging message (or the target paging message) and the target base station receives the response message is similar to that in the prior art. For brevity, details are not described herein.

In view of the above, according to the paging method in this embodiment of the present invention, the first paging parameter group used for paging the terminal device is obtained in the first time period, and when the terminal device enters the light connected mode, the terminal device may be directly paged based on the first paging parameter group, so that the terminal device can be effectively paged, and signaling overheads of core network paging are reduced. In addition, the first paging parameter group is carried in the existing message in the existing protocol, so that signaling overheads can be reduced. This is simple in implementation.

In a possible design, when instructing the terminal device to enter the light connected mode, the anchor base station (for example, the first base station in this embodiment of the present invention) may assign a new paging ID (denoted as a second paging ID for ease of differentiation and description) and/or a paging moment to the terminal device. In this case, the anchor base station may page the terminal device based on the second paging ID and/or the paging moment. Herein, for ease of description, the second paging ID and/or the paging moment are/is denoted as a second paging parameter group. In other words, the second paging parameter group may include only the second paging ID, may include only the paging moment, or may include the second paging ID and the paging moment. The paging moment may be understood as a moment at which the terminal device receives a paging message.

However, after entering the light connected mode, the terminal device may enter the idle mode due to a reason such as a radio link failure, a random access failure, or re-entry into a service area. The terminal device that enters the idle mode monitors a PDCCH based on the first paging parameter group, but the anchor base station does not know that the terminal device enters the light connected mode at this moment, and still pages the terminal device based on the second paging parameter group. Therefore, the terminal device may fail to receive a paging message sent by the anchor base station based on the second paging parameter, in other words, the paging fails.

In view of this, the present invention further provides a paging method. The anchor base station pages the terminal device based on the second paging parameter group, and pages the terminal device based on the first paging parameter group if a response message of the terminal device is not received within a preset duration range, to page the terminal device quickly and effectively when the terminal device enters the idle mode.

A specific process in which the anchor base station (for example, the first base station) pages the terminal device based on the second paging parameter group is described in detail below with reference to FIG. 3 and FIG. 4.

FIG. 3 is a schematic flowchart of a paging method 300 according to another embodiment of the present invention. As shown in FIG. 3, the paging method 300 includes the following steps.

S310. A first base station obtains, in a first time period, a first paging parameter group used for paging a terminal device.

S320. The first base station sends a second RRC message to the terminal device, where the second RRC message indicates that the terminal device enters a light connected mode.

Specifically, specific processes of S310 and S320 are similar to the specific processes of S210 and S230 in the method 200. For brevity, details are not described herein again.

S330, The first base station sends a second paging ID to the terminal device, or the first base station sends a second paging ID and indication information of a paging moment to the terminal device.

When instructing the terminal device to enter the light connected mode, the first base station may assign a new paging identifier (denoted as the second paging ID for ease of distinguishing from the foregoing first paging ID) to the terminal device, or the first base station may configure a new paging moment for the terminal device, or assign both the second paging ID and the paging moment to the terminal device.

Specifically, the first base station may determine, based on whether the first paging parameter group is obtained in the first time period, information to be sent to the terminal device. If the first base station obtains the first paging parameter group in the first time period, the first base station may calculate a PF and a PO based on a terminal ID and a dedicated DRX cycle (or a default DRX cycle of a cell if the first paging parameter group does not include the dedicated DRX cycle) that are in the first paging parameter group. In this case, the first base station may send only the second paging ID to the terminal device. If the first base station fails to obtain the first paging parameter group in the first time period, the first base station may configure the paging moment for the terminal device, and send the second paging ID and the indication information of the paging moment to the terminal device.

Herein, it should be noted that the indication information of the paging moment is used to indicate the paging moment. The indication information of the paging moment may include a new DRX cycle (to be specific, a DRX cycle assigned by the first base station when the first base station instructs the terminal device to enter the light connected mode, where the new DRX cycle may be the same as or different from the dedicated DRX cycle), and a subframe and a moment (namely, the PF and the PO described above) for receiving a paging message. The terminal device may determine the paging moment based on the indication information of the paging moment, and receive the paging message based on the paging moment.

In a possible design, both the second paging ID and the indication information of the paging moment may be carried in the second RRC message in S320, so that signaling overheads are reduced.

S330 may specifically include:
the first base station sends the second RRC message to the terminal device, where the second RRC message may carry the second paging ID, or the second RRC message may carry the second paging ID and the indication information of the paging moment.

S340. The first base station pages the terminal device based on a second paging parameter group.

When receiving downlink data to be sent by an S-GW to the terminal device, the first base station may generate a paging message for the terminal device based on the second paging parameter group, to page the terminal device in an access network paging area.

Herein, it should be noted that if the first base station sends only the second paging ID to the terminal device, the terminal device may receive a paging message based on an original PF and an original PO, where the paging message carries the second paging ID. The terminal device may receive the paging message based on the second paging ID sent by the first base station to the terminal device in S330. If a paging ID (for example, denoted as a paging ID #A) carried in the paging message received by the terminal device is the same as the second paging ID (for example, denoted as a paging ID #B) sent by the first base station to the terminal device in S330, it is considered that the paging message is used to page the terminal device. If the two paging IDs are different, it is considered that the paging message is not used to page the terminal device.

If the first base station sends the second paging ID and the indication information of the paging moment to the terminal device, the terminal device may receive a paging message at the indicated new paging moment based on the indication information of the paging moment. A method for receiving a paging message by the terminal device based on the second paging ID is the same as the foregoing method, and details are not described herein again.

Optionally, S340 may specifically include the following steps.

S341. The first base station generates a fourth paging message based on the second paging parameter group, and sends the fourth paging message to the terminal device.

S342. The first base station generates a fifth paging message, where the fifth paging message carries the second paging ID, or the fifth paging message carries the second paging ID and the indication information of the paging moment, and sends the fifth paging message to the second base station, where the fifth paging message is used to trigger the second base station to send the sixth paging message to the terminal device based on the second paging parameter group.

S343. The second base station sends the sixth paging message to the terminal device based on the second paging parameter group.

The first base station and the second base station each may send a paging message to the terminal device based on the second paging parameter group. In other words, the first base station pages the terminal device in the access network paging area (to be specific, a range of one or more cells).

Herein, it should be noted that if the fifth paging message carries the indication information of the paging moment, the first base station and the second base station each may send a paging message to the terminal device at the indicated paging moment based on the second paging ID and the indication information of the paging moment. In this case, the fourth paging message and the sixth paging message may be a same paging message, to be specific, the fourth paging message and the sixth paging message carry a same paging moment.

If the fifth paging message does not carry the indication information of the paging moment, the first base station and the second base station may separately calculate a PF and a PO based on default DRX cycles configured by the first base station and the second base station, and separately send the paging message to the terminal device based on the PF and PO obtained through calculation. In this case, a PF and a PO for sending the fourth paging message by the first base station are different from a PF and a PO for sending the sixth paging message by the second base station. In other words, the fourth paging message and the sixth paging message are different paging messages.

It may be understood that, if the terminal device is still in the light connected mode, the terminal device may receive a paging message (for example, the fourth paging message or the sixth paging message) sent based on the second paging parameter group. In this case, the terminal device may directly perform S360 to send a response message to the first base station or the second base station based on the received paging message.

S350. The first base station pages the terminal device based on the first paging parameter group.

It can be learned from the foregoing descriptions that, after entering the light connected mode, the terminal device may enter an idle mode. If the first base station and the second base station fail to receive, within preset duration, a response message sent by the terminal device based on the third paging message, it may be considered that the terminal device may enter the idle mode, and the terminal device may be paged based on the first paging parameter group.

In a possible implementation, the first base station and the second base station may separately set a timer, preset a duration threshold, and start the timer when sending the third paging message. If no response message of the terminal device is received within the preset duration threshold, it may be considered that the terminal device enters the idle mode, and the terminal device is paged based on the first paging parameter group (to be specific, a first paging message is sent).

Optionally, S350 may specifically include:
if the first base station and the second base station fail to receive, within the preset duration, a response message sent by the terminal device based on the fourth paging message or the sixth paging message, the first base station pages the terminal device based on the first paging parameter group.

It should be understood that a specific process in which the first base station pages the terminal device based on the first paging parameter group may be similar to the specific process of S220 in the method 200, For brevity, details are not described herein again.

S360. The terminal device sends a response message.

It should be understood that, for ease of understanding, only a case in which the terminal device sends the response message based on the paging message (for example, the first paging message or the fourth paging message) sent by the first base station is shown in the figure, and should not be construed as any limitation on the present invention. The terminal device may also send the response message to the second base station based on the paging message (for example, the third paging message or the sixth paging message) sent by the second base station.

It should be further understood that, an action to be performed after the terminal device sends the response message based on the first paging message and a target base station receives the response message is similar to that in the prior art. For brevity, details are not described herein.

In view of the above, according to the paging method in this embodiment of the present invention, the duration threshold is preset. If no response message of the terminal device is received within the preset duration threshold, the base station switches to the first paging parameter group to page the terminal device, to resolve a problem that a paging message cannot be received because the terminal device enters the idle mode, thereby improving paging efficiency of the base station.

FIG. 4 is a schematic flowchart of a paging method 400 according to still another embodiment of the present invention. As shown in FIG. 4, the paging method 400 includes the following steps.

S410. The first base station sends a second RRC message to the terminal device, where the second RRC message indicates that the terminal device enters a light connected mode.

Specifically, a specific process of S410 is similar to the specific process of S320 in the method 300. For brevity, details are not described herein again.

S420. The first base station obtains, in a second time period, a first paging parameter group used for paging the terminal device.

In this embodiment of the present invention, the first base station may obtain the first paging parameter group from an MME after the terminal device enters the light connected mode or an idle mode.

Specifically, when receiving downlink data sent by an S-GW, the first base station may directly send a paging parameter request message to the MME, to request to obtain the first paging parameter group of the terminal device. The MME may send second S1 interface signaling to the first base station based on the paging parameter request message, where the second S1 interface signaling carries the first paging parameter group.

Optionally, the paging parameter request message may be a paging request message, and the second S1 interface signaling may be an S1 paging message.

Correspondingly, S420 may specifically include:
the first base station sends the paging request message to the MME, where the paging request message carries information used to identify the terminal device; and
the first base station receives the S1 paging message sent by the MME based on the paging request message, where the S1 paging message carries the first paging parameter group.

It should be noted that, when the terminal device establishes an RRC connection, the base station and the MME may assign a terminal of an S1-MME interface to the terminal device (for ease of differentiation and description, for example, the terminal ID of the S1-MME interface may be denoted as a terminal ID-$S1_M$, and it may be understood that the terminal ID is different from the terminal ID described above), and the terminal ID of the S1-MME interface may be understood as a terminal ID of a control plane. In addition, the base station may assign a terminal ID of an S1-U interface to the terminal device by using a tunnel established between the MME and the S-GW (for ease of differentiation and description, for example, the terminal ID of the S1-U interface may be denoted as an ID-$S1_U$, and it may be understood that the terminal ID is also different from the terminal ID and the terminal ID-$S1_M$ described above), and the terminal ID of the S1-U interface may be understood as a terminal ID of a user plane. For the base station, the base station stores correspondences of identifiers of a same terminal device on different interfaces. Therefore, when receiving the downlink data sent by the S-GW, the base station may send, to the MME, information (for example, the terminal ID of the control plane herein or the first paging ID described above) that is used to identify the terminal device, so that the MME initiates paging on the terminal device based on the information.

It should be understood that a specific process in which the MME initiates the S1 paging message may be the same as a specific process in the prior art. For brevity, details are not described herein.

S430. The first base station generates a paging message for the terminal device based on the first paging parameter group, and sends the paging message.

Specifically, a specific process of S430 is similar to the specific process of S220 in the method 200. For brevity, details are not described herein again.

In a process of initiating S1 paging, the MME adds a paging parameter (namely, the first paging parameter group) of the terminal device to the S1 paging message and sends the S1 paging message to the first base station, so that the first base station can page the terminal device based on the first paging parameter group.

Optionally, before S420, the paging method 400 further includes the following steps.

S440. The first base station sends a second paging ID to the terminal device, or the first base station sends a second paging ID and indication information of a paging moment to the terminal device.

S450. The first base station pages the terminal device based on a second paging parameter group.

S460. The terminal device sends a response message.

It can be learned from the foregoing descriptions that, after entering the light connected mode, the terminal device may enter an idle mode. If the terminal device receives a paging message sent by the first base station or a second base station based on the second paging parameter group, S460 is directly performed. If the first base station and the second base station fail to receive, within preset duration, a response message sent by the terminal device based on the third paging message, it may be considered that the terminal device may enter the idle mode, and S430 may be performed, that is, the terminal device is paged based on the first paging parameter group.

Specifically, specific processes of S440 and S450 are similar to the specific processes of S330 and S340 in the method 300. For brevity, details are not described herein again.

It should be understood that, for ease of understanding, only a case in which the terminal device sends the response message based on the paging message sent by the first base station is shown in the figure, and should not be construed as any limitation on the present invention. The terminal device may also send a response message to the second base station based on the paging message sent by the second base station.

In view of the above, according to the paging method in this embodiment of the present invention, a duration threshold is preset. If no response message of the terminal device is received within the preset duration threshold, the base station switches to the first paging parameter group to page the terminal device, to resolve a problem that a paging message cannot be received because the terminal device enters the idle mode, thereby improving paging efficiency of the base station.

The paging method in the embodiments of the present invention is described in detail above with reference to FIG. 2 to FIG. 4. An apparatus in the embodiments of the present invention is described in detail below with reference to FIG. 5 and FIG. 6.

Figure 5:
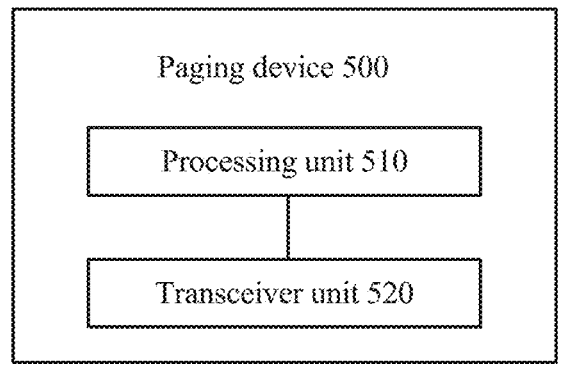
FIG. 5 is a schematic block diagram of a paging device according to an embodiment of the present invention.

FIG. 5 is a schematic block diagram of a paging device 500 according to an embodiment of the present invention. As shown in FIG. 5, the paging device 500 includes a processing unit 510 and a transceiver unit 520. Specifically, the paging device 500 may correspond to the first base station in the foregoing method 200, 300, or 400 (for example, the paging device 500 may be configured as the first base station or may be the first base station), and modules or units in the paging device 500 are separately used to perform actions or processing processes performed by the first base station in the foregoing method 200, 300, or 400. To avoid repetition, details are not described herein again.

Figure 6:
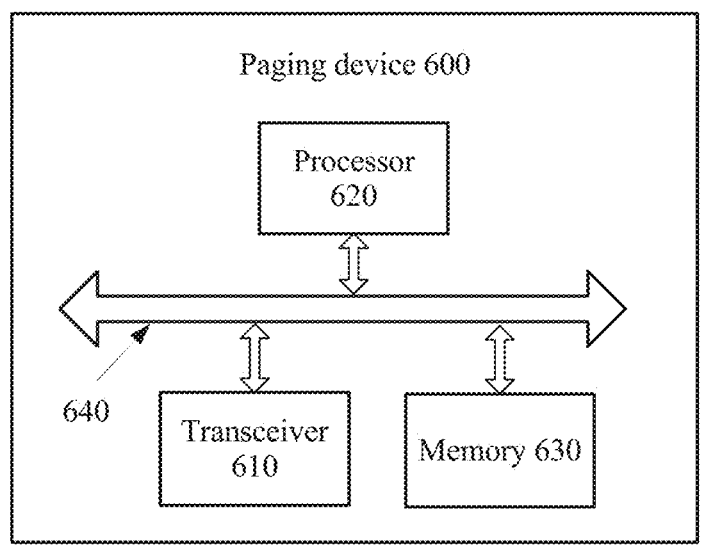
FIG. 6 is another schematic block diagram of a paging device according to an embodiment of the present invention.

FIG. 6 is another schematic block diagram of a paging device 600 according to an embodiment of the present invention. As shown in FIG. 6, the paging device 600 includes a transceiver 610, a processor 620, a memory 630, and a bus system 640. The transceiver 640, the processor 620, and the memory 630 are connected by using the bus system 640. The memory 630 is configured to store an instruction. The processor 620 is configured to execute the instruction stored in the memory 630, to control the transceiver 610 to receive and send a signal. The memory 630 may be disposed in the processor 620, or may be independent of the processor 620. Specifically, the paging device 600 may correspond to the first base station in the foregoing method 200, 300, or 400 (for example, the paging device 600 may be configured as the first base station or may be the first base station), and modules or units in the paging device 600 are separately used to perform actions or processing processes performed by the first base station in the foregoing method 200, 300, or 400. To avoid repetition, details are not described herein again.

It should be understood that the processor in the embodiments of the present invention may be an integrated circuit chip, and has a signal processing capability. In an implementation process, steps in the foregoing method embodiments can be implemented by using a hardware integrated logical circuit in the processor, or by using instructions in a form of software. The processor may be a central processing unit (Central Processing Unit, "CPU" for short), or the processor may be another general purpose processor, a digital signal processor (Digital Signal Processor, "DSP" for short), an application-specific integrated circuit (Application-Specific Integrated Circuit, "ASIC" for short), a field programmable gate array (Field Programmable Gate Array, "FPGA" for short) or another programmable logic device, a discrete gate or a transistor logic device, or a discrete hardware component. The processor may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly performed and completed by using a hardware decoding processor, or may be performed and completed by using a combination of hardware in the decoding processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware in the processor.

It may be understood that the memory in the embodiments of the present invention may be a volatile memory or a nonvolatile memory, or may include a volatile memory and a nonvolatile memory. The nonvolatile memory may be a read-only memory (Read-Only Memory, "ROM" for short), a programmable read-only memory (Programmable ROM, "PROM" for short), an erasable programmable read-only memory (Erasable PROM, "EPROM" for short), an electrically erasable programmable read-only memory (Electrically EPROM, "EEPROM" for short), or a flash memory. The volatile memory may be a random access memory (Random Access Memory, "RAM" for short), and is used as an external cache. Through examples but not limitative description, many forms of RAMs are available, for example, a static random access memory (Static RAM, "SRAM" for short), a dynamic random access memory (Dynamic RAM, "DRAM" for short), a synchronous dynamic random access memory (Synchronous DRAM, "SDRAM" for short), a double data rate synchronous dynamic random access memory (Double Data Rate SDRAM, "DDR SDRAM" for short), an enhanced synchronous dynamic random access memory (Enhanced SDRAM, "ESDRAM" for short), a synchlink dynamic random access memory (Synchlink DRAM, "SLDRAM" for short), and a direct rambus random access memory (Direct Rambus RAM, "DR RAM" for short). It should be noted that the memory in the systems and methods described in this specification aims to include but is not limited to these memories and any memory of another proper type.

It should further be understood that, the bus system may include a power bus, a control bus, a status signal bus, and the like, in addition to a data bus. However, for clear description, various types of buses in the figure are marked as the bus system.

In an implementation process, steps in the foregoing methods can be implemented by using a hardware integrated logical circuit in the processor, or by using instructions in a form of software. The steps of the data transmission method disclosed with reference to the embodiments of the present invention may be directly performed and completed by using a hardware processor, or may be performed and completed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware in the processor. To avoid repetition, details are not described herein again.

An embodiment of the present invention further provides a computer readable storage medium. The computer readable storage medium stores one or more programs, and the one or more programs include an instruction. When the instruction is executed by a portable electronic device that includes a plurality of application programs, the portable electronic device can perform the method in the embodiment shown in FIG. 2, FIG. 3, or FIG. 4.

An embodiment of the present invention further provides a computer readable storage medium. The computer readable storage medium stores one or more programs, and the one or more programs include an instruction. When the instruction is executed by a portable electronic device that includes a plurality of application programs, the portable electronic device can perform the method in the embodiment shown in FIG. 2, FIG. 3, or FIG. 4.

It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A paging method, comprising:
obtaining, by a first access network device, a first paging parameter group used for paging a terminal device, wherein the first paging parameter group comprises a terminal identifier (ID) that is calculated using an international mobile subscriber identity (IMSI) of the terminal device, wherein the IMSI uniquely identifies the terminal device, wherein the first paging parameter group further comprises at least one of a first paging ID or a dedicated discontinuous reception (DRX) cycle, wherein the first paging ID is assigned by a core network device to the terminal device based on the IMSI of the terminal device when the terminal device establishes a Radio Resource Control (RRC) connection, wherein the dedicated DRX cycle is determined by the terminal device, and wherein the first paging parameter group is obtained by either:
  obtaining, by the first access network device in a first time period, the first paging parameter group used for paging the terminal device from the terminal device, wherein the first time period is a time period before the terminal device switches from a connected mode to a light connected mode, and wherein the first access network device is an access network device to which the terminal device is connected to when entering the light connected mode or an idle mode; or
  obtaining, by the first access network device in a second time period, the first paging parameter group used for paging the terminal device from the core network device, wherein the terminal device is in the light connected mode or the idle mode in the second time period;
wherein the first paging parameter group is obtained by:
  sending, by the first access network device, a paging parameter request message to the core network device in the second time period, wherein the paging parameter request message carries information used to identify the terminal device; and
  receiving, by the first access network device, first S1 interface signaling from the core network device, wherein the first S1 interface signaling carries the first paging parameter group;
generating, by the first access network device, a paging message for the terminal device based on the first paging parameter group; and
sending, by the first access network device, the paging message to the terminal device.

2. The paging method of claim 1, wherein when the first access network device obtains the first paging parameter group in the first time period, obtaining, by the first access network device in the first time period, the first paging parameter group used for paging the terminal device comprises:
  receiving, by the first access network device in the first time period, a first RRC message from the terminal device, wherein the first RRC message carries the first paging parameter group; or
  receiving, by the first access network device in the first time period, second S1 interface signaling from the core network device, wherein the second S1 interface signaling carries the first paging parameter group.

3. The paging method of claim 2, wherein the first RRC message comprises an RRC connection request message or an RRC connection setup complete message, and wherein the second S1 interface signaling comprises an initial context setup request message.

4. The paging method of claim 3, wherein the paging parameter request message comprises a paging request message, and wherein the first S1 interface signaling comprises an S1 interface paging message.

5. The paging method of claim 4, wherein generating, by the first access network device, the paging message for the terminal device based on the first paging parameter group, and sending the paging message to the terminal device comprises:
  generating, by the first access network device, a first paging message based on the first paging parameter group;
  sending, by the first access network device, the first paging message to the terminal device;
  generating, by the first access network device, a second paging message, wherein the second paging message carries the first paging parameter group; and
  sending, by the first access network device, the second paging message to a second access network device, wherein the second paging message triggers the second access network device to send a third paging message to the terminal device based on the first paging parameter group, wherein the second access network device is any access network device in an access network paging area except the first access network device, and wherein the access network paging area is determined by the first access network device.

6. The paging method of claim 5, wherein before generating, by the first access network device, the paging message for the terminal device based on the first paging parameter group, the paging method further comprises sending, by the first access network device, a second RRC message to the terminal device, and wherein the second RRC message indicates that the terminal device enters the light connected mode.

7. The paging method of claim 6, wherein before generating, by the first access network device, the paging message for the terminal device based on the first paging parameter group, the paging method further comprises:
  sending, by the first access network device when the first access network device obtains the first paging parameter group in the first time period, either a second paging ID or the second paging ID and indication information of a paging moment to the terminal device; or
  sending, by the first access network device, the second paging ID and indication information of the paging moment to the terminal device when the first access network device fails to obtain the first paging parameter group in the first time period,
  wherein the second paging ID is an ID assigned by the first access network device when the first access network device instructs the terminal device to enter the light connected mode, and
  wherein the indication information of the paging moment indicates a moment at which the terminal device receives the paging message.

8. The paging method of claim 7, wherein the second RRC message carries the second paging ID, or wherein the second RRC message carries the second paging ID and the indication information of the paging moment.

9. The paging method of claim 7, wherein before generating, by the first access network device, the paging message for the terminal device based on the first paging parameter group, the paging method further comprises:
generating, by the first access network device, a fourth paging message based on a second paging parameter group, wherein the second paging parameter group comprises the second paging ID, or wherein the second paging parameter group comprises the second paging ID and the paging moment;
sending, by the first access network device, the fourth paging message to the terminal device;
generating, by the first access network device, a fifth paging message, wherein the fifth paging message carries the second paging ID, or the fifth paging message carries the second paging ID and the indication information of the paging moment; and
sending, by the first access network device, the fifth paging message to the second access network device, wherein the fifth paging message triggers the second access network device to send a sixth paging message to the terminal device based on the second paging parameter group.

10. The method of claim 9, wherein generating, by the first access network device, the paging message for the terminal device based on the first paging parameter group, and sending the paging message comprises:
generating, by the first access network device, the paging message for the terminal device based on the first paging parameter group when the first access network device and the second access network device fail to receive, within a preset duration, a response message from the terminal device based on the fourth paging message or the sixth paging message; and
sending the paging message.

11. A paging device, comprising:
a transceiver;
a memory storing executable instructions; and
a processor coupled to the transceiver and the memory, wherein the processor is configured to execute the executable instructions to cause the paging device to be configured to:
obtain a first paging parameter group used for paging a terminal device, wherein the first paging parameter group comprises a terminal identifier (ID) that is calculated using an international mobile subscriber identity (IMSI) of the terminal device, wherein the IMSI uniquely identifies the terminal device, wherein the first paging parameter group further comprises at least one of a first paging ID or a dedicated discontinuous reception (DRX) cycle, wherein the first paging ID is assigned by a core network device to the terminal device based on the IMSI of the terminal device when the terminal device establishes a Radio Resource Control (RRC) connection, wherein the dedicated DRX cycle is determined by the terminal device, and wherein the first paging parameter group is obtained by either:
obtaining, in a first time period, the first paging parameter group used for paging the terminal device from the terminal device, wherein the first time period is a time period before the terminal device switches from a connected mode to a light connected mode, and wherein the paging device is a device to which the terminal device is connected last time before the terminal device enters the light connected mode or an idle mode; or
obtaining, in a second time period, the first paging parameter group used for paging the terminal device from the core network device, wherein the terminal device is in the light connected mode or the idle mode in the second time period;
wherein the first paging parameter group is obtained by sending a paging parameter request message to the core network device in the second time period, wherein the paging parameter request message carries information identifying the terminal device, wherein the transceiver is further configured to receive first S1 interface signaling from the core network device, and wherein the first S1 interface signaling carries the first paging parameter group; and
generate a paging message for the terminal device based on the first paging parameter group, and
wherein the transceiver is coupled to the processor and configured to send the paging message to the terminal device.

12. The paging device of claim 11, wherein the processor is further configured to:
receive, in the first time period, a first RRC message from the terminal device, wherein the first RRC message carries the first paging parameter group; or
receive, in the first time period, second S1 interface signaling from the core network device, wherein the second S1 interface signaling carries the first paging parameter group.

13. The paging device of claim 12, wherein the first RRC message comprises a connection request message or an RRC connection setup complete message, and wherein the second S1 interface signaling comprises an initial context setup request initial context setup request message.

14. The paging device of claim 11, wherein the paging parameter request message comprises a paging request message, and wherein the first S1 interface signaling comprises an S1 interface paging message.

15. A computer program product comprising computer-executable instructions for storage on a non-transitory computer-readable medium that, when executed by a processor, cause an apparatus to:
obtain, by a first access network device, a first paging parameter group used for paging a terminal device, wherein the first paging parameter group comprises a terminal identifier (ID) that is calculated using an international mobile subscriber identity (IMSI) of the terminal device, wherein the IMSI uniquely identifies the terminal device, wherein the first paging parameter group further comprises at least one of a first paging ID or a dedicated discontinuous reception (DRX) cycle, wherein the first paging ID is assigned by a core network device to the terminal device based on the IMSI of the terminal device when the terminal device establishes a Radio Resource Control (RRC) connection, wherein the dedicated DRX cycle is determined by the terminal device, and wherein the first paging parameter group is obtained by either:
obtaining, by the first access network device in a first time period, the first paging parameter group used for paging the terminal device from the terminal device, wherein the first time period is a time period before the terminal device switches from a connected mode to a light connected mode, and wherein the first access network device is an access network device to which the terminal device is connected to when entering the light connected mode or an idle mode; or obtaining, by the first access network device in a second time period, the first paging parameter group used for paging the terminal device from the core network device, wherein the terminal device is in the light connected mode or the idle mode in the second time period;

wherein the first paging parameter group is obtained:
sending, by the first access network device, a paging parameter request message to the core network device in the second time period, wherein the paging parameter request message carries information used to identify the terminal device; and receiving, by the first access network device, first S1 interface signaling from the core network device, wherein the first S1 interface signaling carries the first paging parameter group;

generate, by the first access network device, a paging message for the terminal device based on the first paging parameter group; and send, by the first access network device, the paging message to the terminal device.

16. The computer program product of claim 15, wherein the paging parameter request message comprises a paging request message, and wherein the first S1 interface signaling comprises an S1 interface paging message.

17. The computer program product of claim 16, wherein the computer-executable instructions cause the apparatus to generate, by the first access network device, the paging message for the terminal device based on the first paging parameter group, and send the paging message to the terminal device comprises the computer-executable instructions causing the apparatus to:

generate, by the first access network device, a first paging message based on the first paging parameter group;

send, by the first access network device, the first paging message to the terminal device;

generate, by the first access network device, a second paging message, wherein the second paging message carries the first paging parameter group; and send, by the first access network device, the second paging message to a second access network device, wherein the second paging message triggers the second access network device to send a third paging message to the terminal device based on the first paging parameter group, wherein the second access network device is any access network device in an access network paging area except the first access network device, and wherein the access network paging area is determined by the first access network device.

18. The computer program product of claim 17, wherein before the computer-executable instructions cause the apparatus to generate, by the first access network device, the paging message for the terminal device based on the first paging parameter group, the computer-executable instructions cause the apparatus to send, by the first access network device, a second RRC message to the terminal device, and wherein the second RRC message indicates that the terminal device enters the light connected mode.

19. The computer program product of claim 18, wherein before the computer-executable instructions cause the apparatus to generate, by the first access network device, the paging message for the terminal device based on the first paging parameter group, the computer-executable instructions cause the apparatus to:

send, by the first access network device when the first access network device obtains the first paging parameter group in the first time period, either a second paging ID or the second paging ID and indication information of a paging moment to the terminal device; or send, by the first access network device, the second paging ID and indication information of the paging moment to the terminal device when the first access network device fails to obtain the first paging parameter group in the first time period, wherein the second paging ID is an ID assigned by the first access network device when the first access network device instructs the terminal device to enter the light connected mode, and wherein the indication information of the paging moment indicates a moment at which the terminal device receives the paging message.

20. The computer program product of claim 19, wherein the second RRC message carries the second paging ID, or wherein the second RRC message carries the second paging ID and the indication information of the paging moment.

* * * * *